(12) United States Patent
Hirsch et al.

(10) Patent No.: US 7,740,541 B2
(45) Date of Patent: Jun. 22, 2010

(54) DRIVE SHAFT HAVING A HEAT SHIELD SLEEVE

(75) Inventors: Dietmar Hirsch, Braunschweig (DE); Jürgen Linzmeier, Gifhorn (DE)

(73) Assignee: Volkswagen AG, Wolfsburg (DE)

( * ) Notice: Subject to any disclaimer, the term of this patent is extended or adjusted under 35 U.S.C. 154(b) by 824 days.

(21) Appl. No.: 11/266,656

(22) Filed: Nov. 2, 2005

(65) Prior Publication Data
US 2006/0094517 A1 May 4, 2006

(30) Foreign Application Priority Data
Nov. 2, 2004 (DE) .................. 10 2004 052 796

(51) Int. Cl.
*F16C 3/00* (2006.01)
(52) U.S. Cl. ...................... 464/170; 464/902
(58) Field of Classification Search ............. 464/170, 464/174, 181, 183, 902; 74/606 A, 607, 74/609; 180/380
See application file for complete search history.

(56) References Cited

U.S. PATENT DOCUMENTS

| | | | |
|---|---|---|---|
| 3,190,412 A * | 6/1965 | Rutter et al. | |
| 4,033,020 A | 7/1977 | Hudgens | |
| 4,127,080 A * | 11/1978 | Lakiza et al. | 464/183 X |
| 4,560,188 A | 12/1985 | Berti et al. | |
| 6,186,901 B1 | 2/2001 | Bondioli | |
| 6,254,488 B1 * | 7/2001 | Hill | 464/183 |
| 2003/0136553 A1 * | 7/2003 | Mazuy | |

FOREIGN PATENT DOCUMENTS

| | | |
|---|---|---|
| DE | 6607166 | 1/1971 |
| DE | 25 25 045 | 12/1976 |
| DE | 26 35 120 C2 | 2/1977 |
| DE | 30 13 791 | 10/1980 |
| DE | 39 43 248 A1 | 7/1990 |
| DE | 90 11 147 U1 | 10/1990 |
| DE | 40 25 958 A1 | 2/1992 |
| EP | 0 032 370 A2 | 1/1981 |
| EP | 0 471 240 A2 | 2/1992 |
| EP | 0 918 952 B1 | 7/2003 |
| GB | 2 045 884 A | 3/1980 |
| GB | 2 227 544 A | 8/1990 |

* cited by examiner

*Primary Examiner*—G. Binda

(57) ABSTRACT

A drive shaft is provided with a sleeve enclosing at least sections thereof. The sleeve is fixed to the drive shaft in order that it may rotate with the drive shaft. The sleeve forms a heat shield with heat-reflecting and/or heat-insulating properties. This serves to effectively reduce the heat input into the drive shaft. In contrast to conventional heat shield plates, the problem of fixing is eliminated. Moreover, a heat shield sleeve according to the invention can also still be fitted in situations wherein the space is too restricted for a heat shield plate. In addition a savings in weight and material also results.

11 Claims, 3 Drawing Sheets

DRIVE SHAFT HAVING A HEAT SHIELD SLEEVE

BACKGROUND OF THE INVENTION

Field of the Invention

The invention relates to a drive shaft having a sleeve enclosing at least sections thereof. The sleeve is fixed to the drive shaft in order that it may rotate with the drive shaft.

In motor vehicles a drive shaft sometimes has to be led toward the rear underneath the vehicle in order to drive the rear wheels. This relates, for example, to rear wheel drive vehicles and also vehicles with all-wheel drive.

An exhaust system is generally furthermore disposed underneath the vehicle in order to lead combustion gases off to the rear.

The operating temperatures attained on the exhaust system generate radiant heat, which can adversely affect the components of the drive shaft and their bearings, and any other devices that may be provided, such as sensors and the like. Components, especially those situated outside the direct radiant heat area, can also be adversely affected by thermal conduction. Heat shield plates are therefore generally provided in order to protect the sensitive components from radiant heat. A heat shield plate is capable of reducing the heat input into the drive shaft. As a result the associated bearings and other components are also exposed to smaller thermal loads, since the temperatures on the drive shaft are reduced. A reduced heat input also reduces the problem of heat dissipation into surrounding components and elements integrated into the shaft.

Heat shield plates take up overall space, however. Moreover, it must be ensured that an adequate clearance is left for the exhaust system and for the drive shaft, in order to avoid impinging in the event of vehicle shocks and vibrations. In addition, fixing points for the shield plates must be provided on the vehicle.

SUMMARY OF THE INVENTION

It is accordingly an object of the invention to provide a drive shaft with a heat shield which overcomes the above-mentioned disadvantages of the heretofore-known devices and methods of this general type and which prevents excessive heating of the drive shaft.

With the foregoing and other objects in view there is provided, in accordance with the invention, a drive shaft assembly, comprising:
 a rotatably disposed drive shaft;
 a sleeve enclosing at least a segment of said drive shaft and fixed to said drive shaft for rotation therewith, said sleeve being configured as a heat shield sleeve with heat-reflecting and/or heat-insulating properties.

In other words, the objects of the invention are achieved in that the drive shaft has a sleeve enclosing at least sections thereof. The sleeve is fixed to the drive shaft in order that it may rotate with the drive shaft and the sleeve being of heat-reflecting and/or heat-insulating design construction.

This serves to effectively reduce the heat input into the drive shaft. In contrast to conventional heat shield plates, the problem of fixing to the vehicle is eliminated. Moreover, a heat shield sleeve according to the invention can also still be fitted in situations wherein the space is too restricted for a heat shield plate. In addition a saving in weight and material also generally results.

European published patent application EP 0 032 370 A2 discloses the fitting of a sleeve to a drive shaft. There, however, the sleeve serves as a damper mass for damping oscillations and it is accordingly tightly connected to the drive shaft. Considered in thermal terms, the two form a unified body, which in proximity to a heat-emitting device heats up as a whole. Any thermal shielding of the drive shaft and the associated components is not possible with the solution proposed in EP 0 032 370 A2.

In addition German published patent application DE 30 13 791 A1 (cf. GB 2 045 884 A) and European patent EP 0 918 952 B1 (cf. U.S. Pat. No. 6,186,901 B1) disclose protective sleeves for drive shafts, which are in each case separated from the drive shaft. In both cases, however, the protective sleeve is stationary and is intended to prevent persons injuring themselves on the moving drive shaft or getting caught up by their clothing or their hair. The stationary arrangement, however, requires an especially elaborate fixing with correspondingly greater overall dimensions. Such a solution is not very suitable for confined spaces.

Further measures may be taken to make the solution according to the invention particularly advantageous.

Thus, for example, an especially effective insulation area may be provided between the sleeve and the drive shaft by forming at least one hollow space between the sleeve and the drive shaft. This hollow space may extend annularly around the drive shaft, for example. It is also possible, however, to provide a plurality of hollow spaces, preferably arranged like a honeycomb. In all cases the air enclosed acts as an insulator.

According to a further advantageous embodiment of the invention the sleeve has a sheet metal body, which is easy and economic to manufacture. At the same time the materials in question are largely heat-reflecting materials.

It has proved particularly advantageous for the heat insulation to produce the sheet metal body from an aluminum alloy or from aluminum.

In order to ensure sufficient rigidity and to avoid droning noises, the sheet metal body, especially where it is separated from the drive shaft over a relatively long axial length thereof, may be provided with a stamped pattern. It is feasible, for example, to produce the sleeve from a goffered sheet metal. Such a sheet metal may also be used, however, when the sheet metal body rests on the drive shaft. The stamping then leads to insulating air cushions.

According to a further advantageous embodiment the sleeve is fixed to the drive shaft by its end sections. In this case the contact and fixing may be confined to the end sections. It is also possible, however, to provide the sleeve with multiple supports on the drive shaft.

Instead of using air as insulator a heat-insulating compound may also be applied to the sleeve for this purpose. In particular, it is possible to fix a heat-reflecting outer casing of sheet metal to the drive shaft by means of the heat-insulating compound.

According to a further advantageous embodiment of the invention the sleeve is formed on the drive shaft solely by an applied insulating compound. This is easily applied in an initially amorphous state and is then fixed, by curing for example.

The drive shaft explained above having a heat shield sleeve together with said modifications may be used wherever a drive shaft needs to be led past a device emitting radiant heat in close proximity thereto.

On a motor vehicle this relates, for example, to a drive shaft which runs close to the engine or to the exhaust system. In this case the drive shaft is preferably enclosed by the protective sleeve at least in the area of the device emitting radiant heat.

The drive shaft may be a prop shaft or a cardan shaft, for example, which runs next to the exhaust system. The heat shield sleeve allows the drive shaft to be arranged in close proximity to the exhaust system. As already explained above, this permits a very compact arrangement of said components, which would not be possible with a conventional heat shield plate.

According to an advantageous embodiment of the invention the drive shaft runs above a converter of the exhaust system.

In the installation situation described the heat shield sleeve is preferably arranged between a transmission output and a bearing supporting the drive shaft on the vehicle body.

Other features which are considered as characteristic for the invention are set forth in the appended claims.

Although the invention is illustrated and described herein as embodied in a drive shaft having a heat shield sleeve, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

The invention will be explained in more detail below with reference to an exemplary embodiment represented in the drawing, wherein:

DESCRIPTION OF THE PREFERRED EMBODIMENTS

Figure 1:
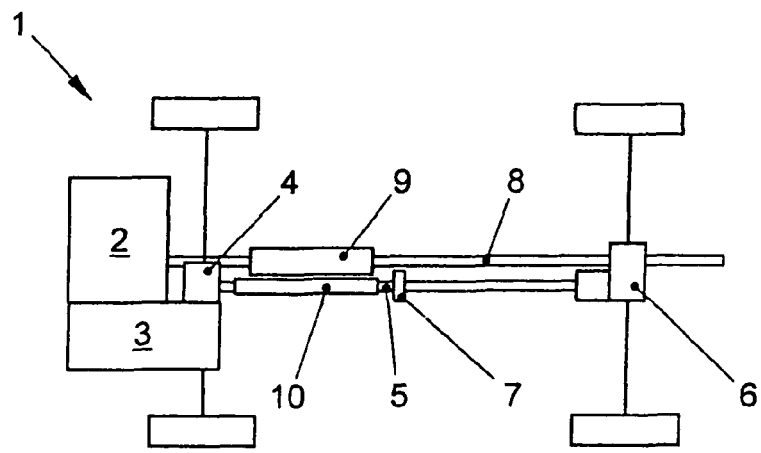
FIG. 1 is a schematic plan view of a vehicle with a drive shaft according to the invention, provided with a heat shield sleeve.

Referring now to the figures of the drawing in detail and first, particularly, to FIG. 1 thereof, there is shown a motor vehicle 1 with all-wheel drive, which has a transversely mounted engine 2. The drive power output of the engine 2 is transmitted by way of a transmission 3 and a differential 4 to a drive shaft 5. Here, the drive shaft 5 is in the form of a propeller shaft or cardan shaft that leads under the vehicle floor 20 to a rear axle differential 6. The drive shaft 5 is supported against the vehicle body by way of an intermediate bearing 7.

FIG. 1 also shows an exhaust system 8 which, at least in sections, runs parallel to the drive shaft 5. The exhaust system 8 comprises a converter 9, which in operation reaches high temperatures and radiates heat toward the drive shaft 5.

Figure 2:
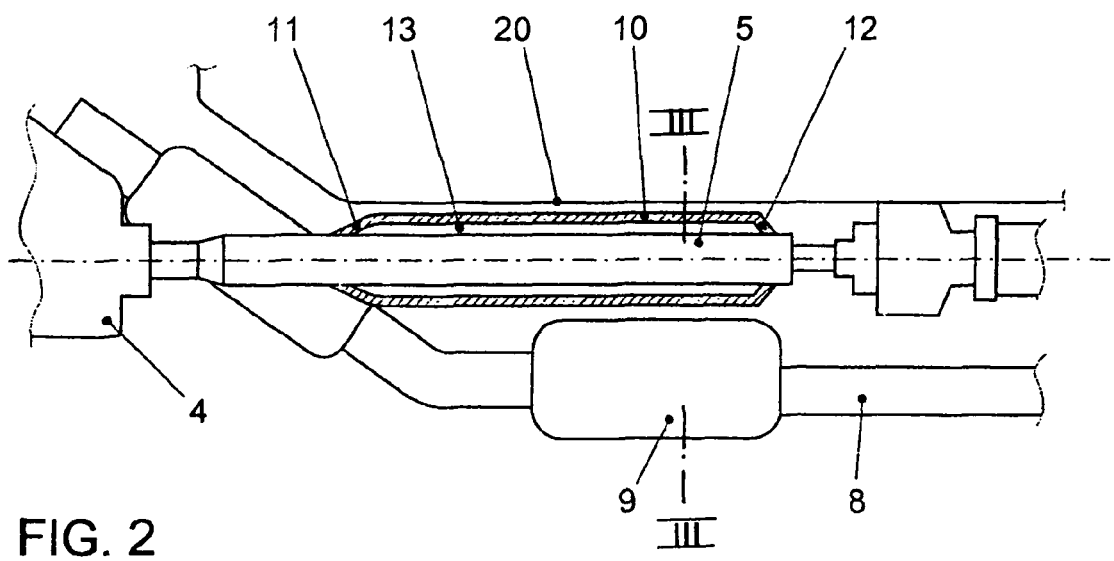
FIG. 2 shows a side view of the drive shaft next to a converter of an exhaust system.

As FIG. 2, in particular, shows, the drive shaft 5, owing to the restricted space available, runs close to the converter 9 and other parts of the exhaust system, in this case above the converter 9, the intermediate bearing 7 being situated behind the converter 9 in the vehicle longitudinal direction.

Tests have shown that in this installation situation, without any heat shielding, temperatures in the order of approximately 240° C. are reached on the drive shaft 5. This leads to a considerable thermal load in the area of the intermediate bearing 7, the roll bellows of which is here particularly subjected to stress.

By using a heat-reflecting and/or heat-insulating sleeve 10 the temperature of the drive shaft 5 is significantly reduced. As a result the components coupled to the drive shaft are also exposed to lesser thermal loads.

The heat shield sleeve 10 preferably extends at least over the entire area exposed to radiant heat. In the exemplary embodiment represented here the heat shield sleeve 10 accordingly runs basically between the output of the differential 4 and the intermediate bearing 7.

The heat shield sleeve 10 is at the same time fixed to the drive shaft 5, so that in contrast to a conventional heat shield plate no fixing devices have to be provided on the vehicle body or the exhaust system.

The heat shielding can be achieved in various ways. A basic distinction can be made between shielding through heat reflection and shielding through heat insulation. The two principles may be combined with one another, however. Some non-restrictive embodiments of the heat shield sleeve will therefore be explained below.

Figure 3:
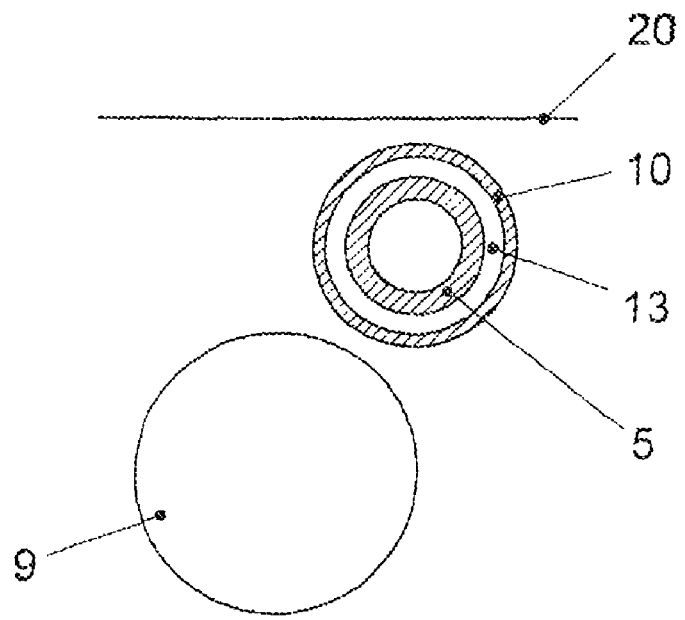
FIG. 3 is a sectional view through the drive shaft and the heat shield sleeve, taken along the line III-III in FIG. 2.

FIG. 3 shows a first embodiment of a heat shield sleeve 10. This comprises a sheet metal body which, as shown in FIG. 2, is fixed to the drive shaft 5 solely at the end sections 11 and 12, but which is otherwise separated from said shaft. The hollow annular space 13 thereby formed between the heat shield sleeve 10 and the drive shaft 5 forms an insulation area. The outside of the heat shield sleeve 10 is moreover of heat-reflecting design. The heat shield sleeve is for this purpose preferably composed of an aluminum alloy or aluminum.

Figure 4:
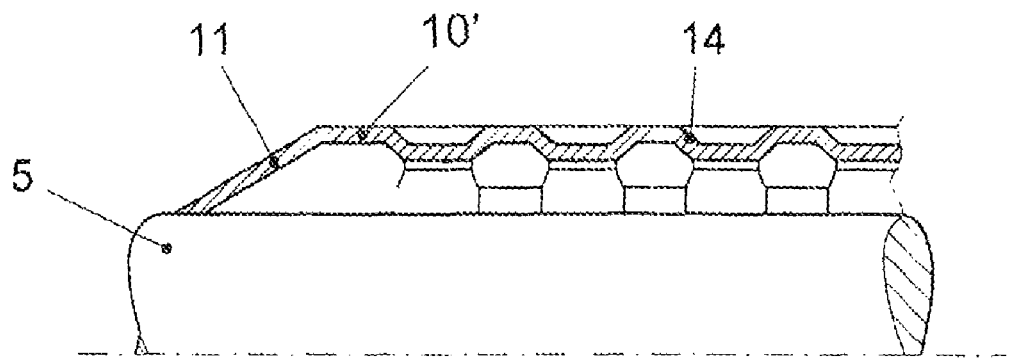
FIG. 4 shows a partial sectional view along the drive shaft for a further embodiment of the heat shield sleeve having a goffered stamping.

In order to improve the rigidity of the sleeve and to avoid the occurrence of droning noises, the sleeve, as shown in FIG. 4, may be provided with a stamped pattern 14. In the exemplary embodiment represented here at least one section of the sleeve 10' takes the form of a goffered or crimped sheet metal.

Figure 5:
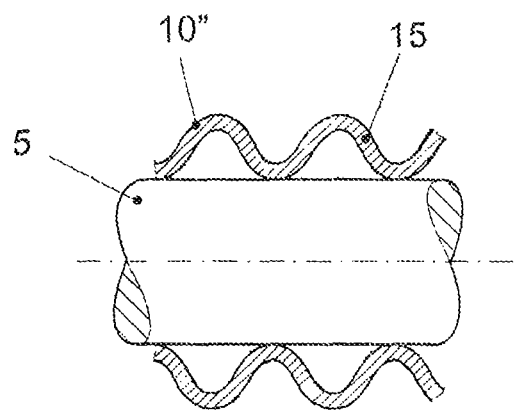
FIG. 5 shows a partial sectional view along the drive shaft for a further embodiment of the heat shield sleeve in the form of a corrugated tube.

The sleeve may also have multiple supports on the drive shaft 5. FIG. 5 shows an example of this in the form of a corrugated tube 15, which with its inwardly curved sections comes into contact with the drive shaft 5. In this way a series of annular spaces is formed, which have an insulating effect. Here too, the outside of the sleeve 10" may again be of heat-reflecting design.

A similar configuration is also obtained through the use of a sleeve according to FIG. 4, which with its stamped pattern section 14 bears directly against the drive shaft 5. This results in a plurality of honeycomb-like hollow spaces, which act as insulating air cushions.

Figure 6:
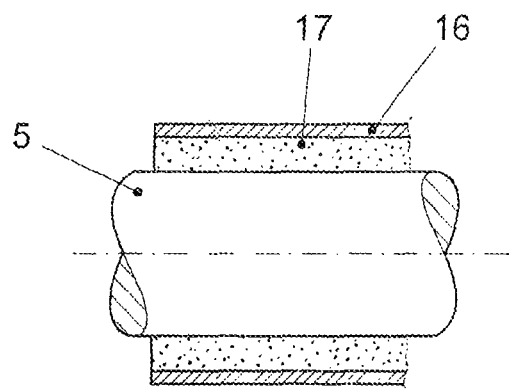
FIG. 6 shows a partial sectional view along the drive shaft for a further embodiment of the heat shield sleeve in the form of a sandwich construction.

Instead of air, some other medium, such as a heat-insulating compound, may also be provided in the afore-mentioned hollow spaces. This compound can moreover serve for fixing a heat-shielding sheet metal body to the drive shaft 5. FIG. 6 shows a corresponding embodiment, wherein a heat-reflecting outer sleeve 16 is fixed to the drive shaft 5 by means of an amorphous insulating compound 17. The insulating compound 17 can here also be confined to selected fixing sections.

Figure 7:
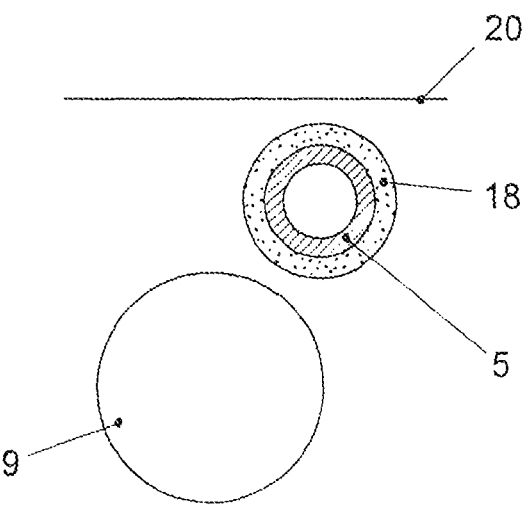
FIG. 7 is a sectional view, taken at a similar location as FIG. 3, through the drive shaft and a further embodiment of the heat shield sleeve.

Alternatively the heat shield sleeve, as shown in FIG. 7, may also be formed solely by an insulating compound 18 applied to the drive shaft 5. Initially moldable liquid or pasty media, which are easy to apply and then fix, by curing for example, lend themselves particularly to this purpose. Design constructions wherein an insulating compound is first applied to the drive shaft 5 and the insulating compound then coated with a heat-reflecting layer, are also feasible.

The invention has been explained in more detail above with reference to exemplary embodiments. However, it is not limited to these or to the installation situation described above, but encompasses all embodiments defined by the claims.

In particular a heat shield sleeve may in fact be used on a drive shaft even when this is already protected by a stationary heat shield plate. In this way the heat shielding may be further augmented.

Instead of a sheet metal body, a heat-resistant plastic, a composite material or a carbon fiber material may furthermore be provided as the carrier component. If necessary, the outside of the carrier component is provided with a heat-reflecting layer.

This application claims the priority, under 35 U.S.C. §119, of German patent application No. 10 2004 052 796.2, filed Nov. 2, 2004; the entire disclosure of the prior application is herewith incorporated by reference.

We claim:

1. A drive shaft assembly, comprising:
 a rotatably disposed drive shaft;
 a heat shield sleeve enclosing at least a segment of said drive shaft and fixed to said drive shaft for rotation therewith, said heat shield sleeve having heat-reflecting and/or heat-insulating properties;
 wherein said heat shield sleeve is disposed relative to said drive shaft to define a hollow air space forming an insulation area between said drive shaft and said heat shield sleeve, and said heat shield sleeve is formed with a sheet metal body made of an aluminum alloy or aluminum.

2. The drive shaft assembly according to claim 1, wherein said hollow space is an annular space.

3. The drive shaft assembly according to claim 1, wherein said hollow space is formed with a plurality of honeycomb hollow spaces.

4. The drive shaft assembly according to claim 1, wherein said sheet metal body is formed with a stamped pattern.

5. The drive shaft assembly according to claim 1, wherein said heat shield sleeve is formed with end sections fixed to said drive shaft.

6. The drive shaft assembly according to claim 1, wherein said heat shield sleeve is supported on said drive shaft at a plurality of support locations on said drive shaft.

7. The drive shaft assembly according to claim 1, which comprises an insulating compound disposed on said heat shield sleeve.

8. In a motor vehicle having a device emitting radiant heat, the drive shaft assembly according to claim 1 disposed to extend past the device emitting radiant heat, wherein said heat shield sleeve encloses said drive shaft in a region of the device emitting radiant heat.

9. The motor vehicle according to claim 8, wherein the device emitting radiant heat is a part of an exhaust system of the motor vehicle, and said drive shaft is led past the exhaust system in close proximity thereto.

10. The motor vehicle according to claim 8, wherein the device emitting radiant heat is a converter of an exhaust system of the motor vehicle, and said drive shaft and said sleeve are disposed adjacent the converter.

11. The motor vehicle according to claim 8, wherein said heat shield sleeve is disposed on said drive shaft between a transmission output and a bearing supporting said drive shaft on the vehicle body.

\* \* \* \* \*